United States Patent [19]

Glaubitz et al.

[11] Patent Number: 4,736,753

[45] Date of Patent: * Apr. 12, 1988

[54] ARRANGEMENT FOR UNIFORM DISTRIBUTION OF AGRICULTURAL PRODUCTS IN SELF-PROPELLED HARVESTER THRESHERS, AND HARVESTER THRESHER PROVIDED THEREWITH

[75] Inventors: Franz Glaubitz; Günter Eis; Werner Fromme, all of Harsewinkel, Fed. Rep. of Germany

[73] Assignee: CLAAS OHG, Harsewinkel, Fed. Rep. of Germany

[*] Notice: The portion of the term of this patent subsequent to Jul. 8, 2003 has been disclaimed.

[21] Appl. No.: 825,091

[22] Filed: Jan. 31, 1986

Related U.S. Application Data

[63] Continuation of Ser. No. 645,843, Aug. 29, 1984, Pat. No. 4,598,718.

[30] Foreign Application Priority Data

Sep. 10, 1983 [DE] Fed. Rep. of Germany ....... 3332763

[51] Int. Cl.⁴ ............................................. A01F 12/32
[52] U.S. Cl. ................................. 130/27 AE; 130/24; 130/DIG. 1; 56/209; 56/212
[58] Field of Search ................ 56/10.2, 209, 210, 212, 56/DIG. 5, DIG. 10, DIG. 15; 130/27 AE, 24, 25, 27 Z, DIG. 1; 209/416

[56] References Cited

U.S. PATENT DOCUMENTS

| | | | |
|---|---|---|---|
| 366,242 | 7/1887 | Parnell | 130/27 AE |
| 1,064,440 | 6/1913 | Brown | 130/27 AE |
| 2,691,444 | 10/1954 | Oliver | 130/27 AE |
| 2,718,967 | 9/1955 | Potter | 130/27 AE |
| 3,269,685 | 8/1966 | Wallace | 56/210 |
| 4,344,443 | 8/1982 | DeBusselier et al. | 130/27 Z |
| 4,598,718 | 7/1986 | Glaubitz | 130/27 AE |

*Primary Examiner*—John Weiss
*Attorney, Agent, or Firm*—Michael J. Striker

[57] ABSTRACT

In a harvester thresher an arrangement for uniform distribution of agricultural product on a reciprocating transporting and cleaning organs of a sieve conveyor includes an upper sieve of a sieve box which is formed so that it has a transporting component toward a side changeable in its value in dependence upon an inclined position of the harvester thresher during threshing on an inclined surface.

2 Claims, 3 Drawing Sheets

ARRANGEMENT FOR UNIFORM DISTRIBUTION OF AGRICULTURAL PRODUCTS IN SELF-PROPELLED HARVESTER THRESHERS, AND HARVESTER THRESHER PROVIDED THEREWITH

This is a continuation of application Ser. No. 645,843, filed Aug. 29, 1984, now allowed, U.S. Pat. No. 4,589,718.

BACKGROUND OF THE INVENTION

The present invention relates to an arrangement for uniform distribution of products on reciprocable transporting and cleaning organs of sieve conveyors in inclined position, for example for uniform distribution of agricultural products in sieve boxes of a self-propelled harvester thresher during threshing on laterally inclined slopes, wherein the swinging (oscillating) direction and thereby also the transporting direction of the transported product is changeable in dependence upon the lateral inclination of the transporting or cleaning organ.

Arrangement of the abovementioned general type are known in the art. One of such arrangements is disclosed, for example in the U.S. Pat. No. 4,355,647. It has been, however, recognized from practice that since the whole sieve box must be deflected from its rectilinear oscillating movement, great masses must be moved that causes considerable strength problems. A further disadvantages of this construction is that the guide means applied for the deflection and the necessary cross joints are subjected to a very high wear. Not the least is the considerable disadvantage in that almost all means required for the deflection are arranged inside the harvester thresher housing. As a result of this, a significant part of an inner space required for other important devices, for example for the tank, is lost.

SUMMARY OF THE INVENTION

Accordingly, it is an object of the present invention to provide an arrangement for uniform distribution of products in self-propelled harvester thresher, which avoids the disadvantages of the prior art.

More particularly, it is an object of the present invention to provide an arrangement for uniform distribution of products in a self-propelled harvester thresher which satisfies the requirements made thereto and particularly in the sense of a wear-free operation.

In keeping with these objects and with others which will become apparent hereinafter, one feature of the present invention resides, briefly stated, in an arrangement in which only an upper sieve of a sieve box has a transporting component toward a side, changeable in its value, in dependence upon an inclined position of the harvesting thresher during threshing on an inclined surface.

Another feature of the present invention is to provide a harvester thresher which has the arrangement as described hereinabove.

When the arrangement is designed in accordance with the present invention, instead of the whole sieve box, only the upper sieve is deflectable laterally, therefore, the deflecting masses are considerably reduced, so that means required for deflecting can be made considerably smaller.

In accordance with a further feature of the present invention, the upper sieve is suspended with the aid of an elastic member in the machine housing, and the upper sieve is engaged by links which extend outwardly through slots in a sieve box lateral wall and through slots in the harvester thresher lateral wall and are rotatably mounted on longitudinally displaceable supporting pieces connected with the outer side of the harvester thresher lateral wall. When the arrangement is designed in accordance with these features, the means required for the longitudinal change are arranged outside of the machine housing, so that no structural space is lost inside the machine on the one hand, and dust which takes place in the sieve box region cannot dirty and cause wear on the other hand.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
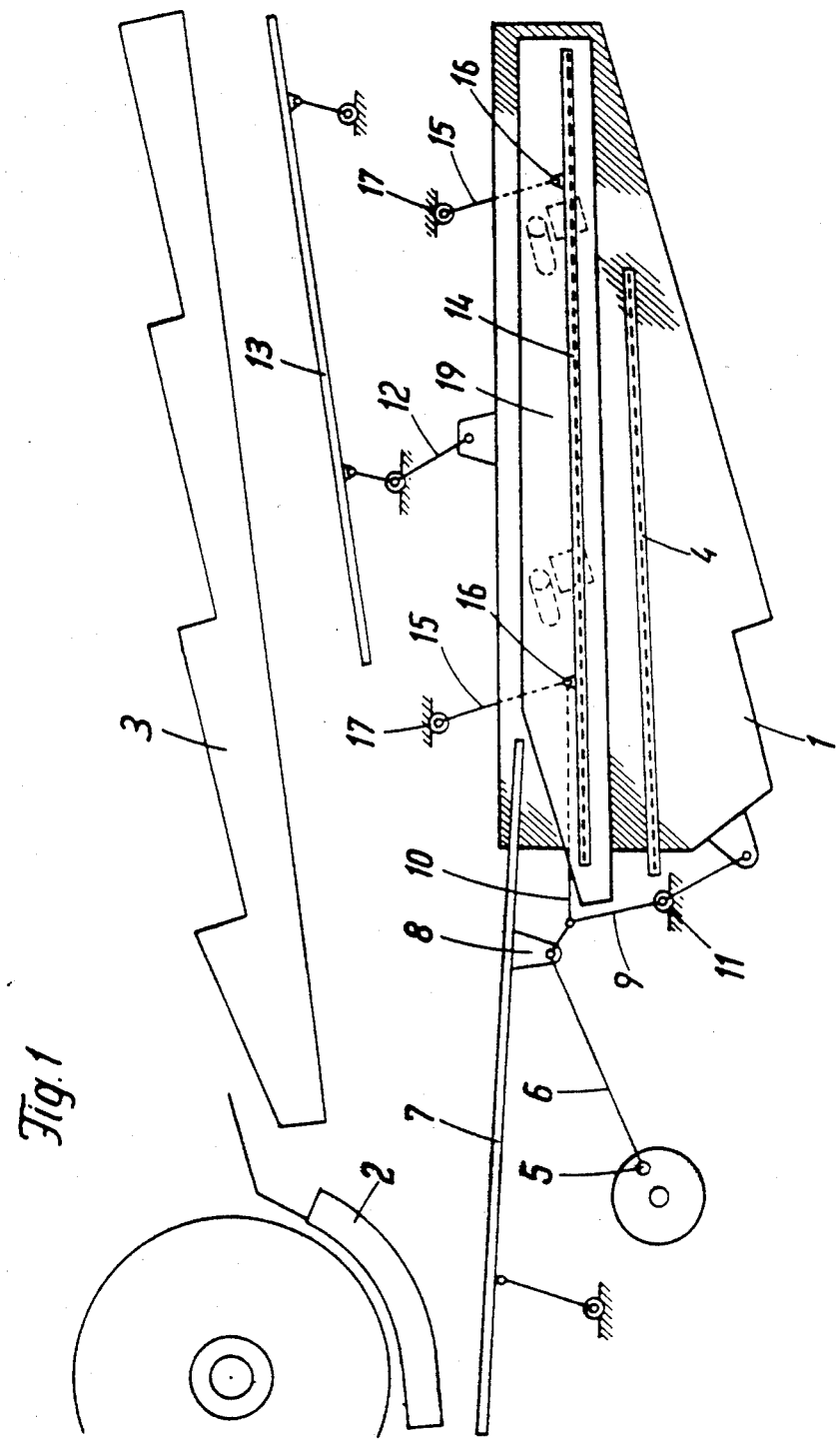
FIG. 1 is a side view of a cleaning part of a harvester thresher, in accordance with the present invention.

Reference numeral 1 identifies a sieve box of a not shown harvester thresher. The sieve box has the function of cleaning of grain-chaff mixture which falls both through a threshing basket 2 and also through a vibrator 3. A lower sieve 4 is supported in the sieve box 1.

A reciprocating drive is performed via a driven crank pin 5 with a crank rod 6 which is articulatedly connected with a console 8 mounted on a conveyor bottom 7. A double-armed lever 9 is also connected with the console 8 in this point. The double-armed lever 9 is supported substantially centrally in a fixed point 11 of a machine housing.

The double-armed lever is pivotally connected with its lower end with the sieve box 1 which thereby has no drive. A coupling rod 10 is pivotably connected with the upper part of the lever 9. The other end of the coupling rod 10 engages in a bearing point 16 with a frame 19 of an upper sieve 14 and thereby provides the drive for the same.

As can be seen from FIG. 1, the reciprocating movement of the sieve box 1 provides via a lever 12 the drive for a return bottom 13. In addition to the sieve box 1, the upper sieve 14 is also suspended via a lever 15 in the side walls of the harvester thresher. Both the bearing point 16 and the bearing point 17 are movable at all sides. The upper sieve 14 obtains its drive via the coupling rod 10. In contrast to the known harvester threshers, the upper sieve 14 is suspended independently from the sieve box 1.

Figure 2:
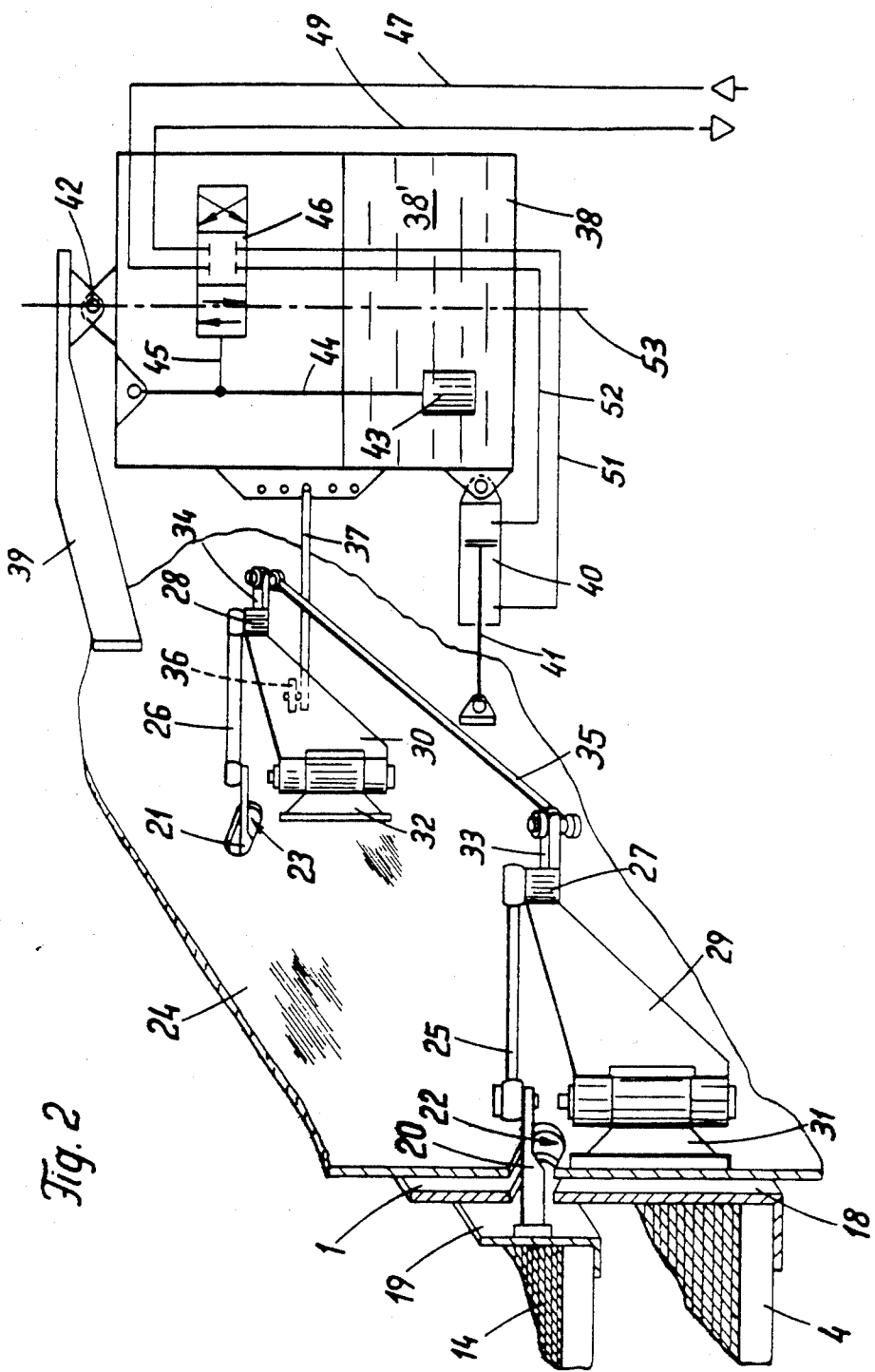
FIG. 2 is a perspective partial view of the harvester thresher of FIG. 1, as seen from one side.

FIG. 2 shows the lower sieve 4 as well as a lateral wall 18 of the sieve box 1. The upper sieve 14 is swingably suspended on the thresher body by means of links 15 and ball-and socket joints 16 and 17 above the lower sieve 4 in a frame 19. Two holders 20 and 21 located at a distance from one another are fixedly connected with the frame 19 and extend outwardly through slot openings 22 and 23 both in the side wall 18 of the sieve box and in the side wall 24 of the harvester thresher. The slot like openings 22 and 23 are inclined at an acute angle relative to the lower sieve 4.

The holders 20 and 21 have free ends which carry links 25 and 26. The links 25 and 26 are rotatably supported in supporting pieces 27 and 28 and their end facing away from the holders. The supporting pieces 27 and 28 form parts of turning levers 29 and 30 which are rotatably supported in consoles 31 and 32 fixedly connected with the wall 24 of the harvester thresher. Arms 33 and 34 are welded with both supporting pieces 27 and 28 and connected with one another via a coupling rod 35.

Figure 3:
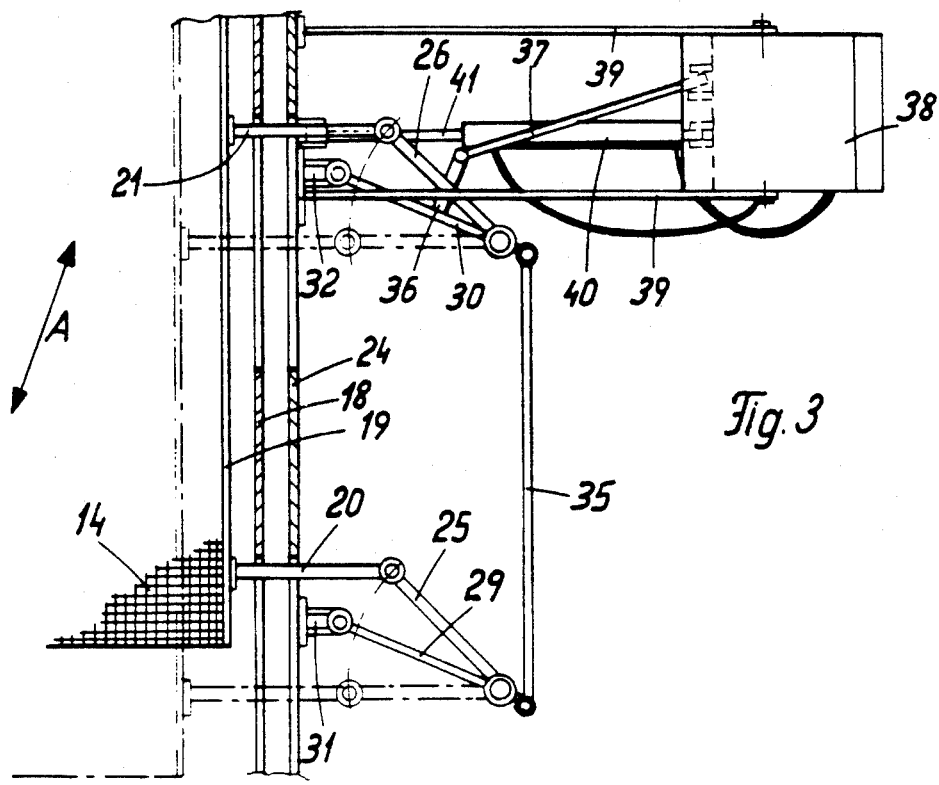
FIG. 3 is a view showing the arrangement of FIG. 2 with an extended cylinder-piston unit.
Figure 4:
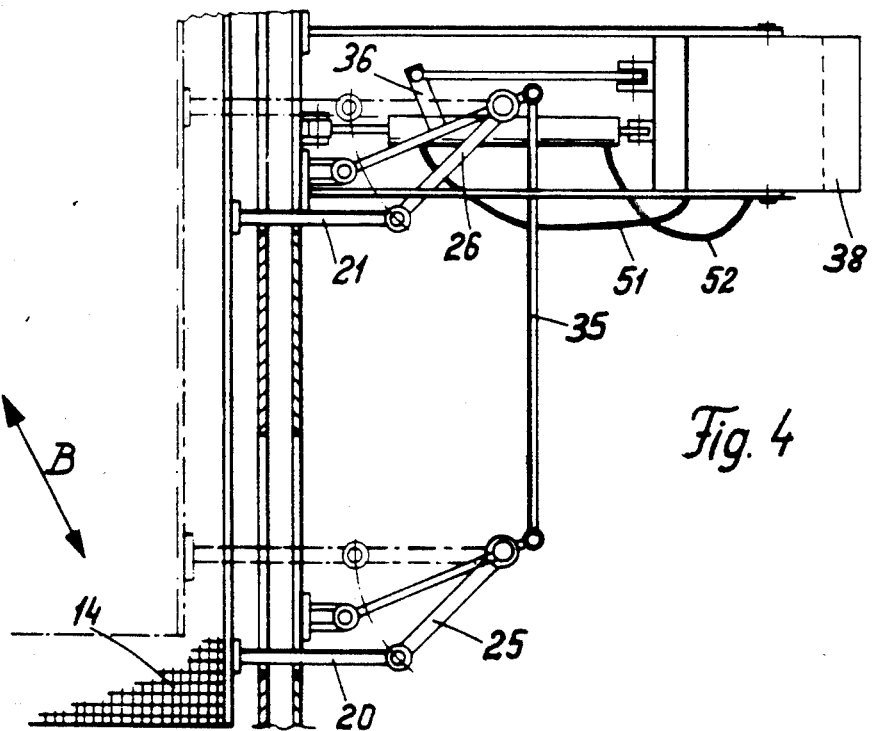
FIG. 4 is a view showing the arrangement of FIG. 2 with the retracted cylinder-piston unit.

As can be seen from FIGS. 2-4, a holder 36 is fixedly connected with a turning lever 30 and carries an end of a coupling rod 37 which at its other end is movably connected with a container 38. The container 38 is turnably suspended on a supporting arm 39 which is fixedly connected with the wall 24 of the harvester thresher. A cylinder 40 of a hydraulic cylinder-piston unit engages under the coupling rod 37 with the container 38, and its piston rod 41 is mounted on the side wall 24.

When the piston rod 41 is extended or retracted, the container 38 is turned around its suspension point 42 in counterclockwise direction or clockwise direction. Thereby the angular position of the turning levers 29 and 30 and therefore the position of the upper sieve 14 relative to the side wall 18 of the sieve box are changed, as indicated by arrows in FIGS. 3 and 4. Also the value of the lateral movement component of the upper sieve 14 is changed during its swinging movement. This takes place automatically in dependence upon the inclined position of the harvester thresher, a slope or in other words in dependence on the inclination of the harvester thresher about its longitudinal axis in the following manner.

A pendulum 43 is turnably suspended in the container 38 to swing transversely transverse to the traveling direction of the harvester thresher. Its movement is dampened by a damping means 38 arranged in the container 38. A switching rod 45 of a control valve 46 located in the container 38 engages with a pendulum rod 44. The control valve 46 is in communication, via conduit 47, with a return conduit of a hydraulic device available in the machine and via a conduit 49 with a tank of this device. Further conduits 51 and 52 lead from the control valve 46 to the cylinder 40. When the harvester thresher is inclined on a slope, the inclination also takes place in the container 38 which is connected, on the one hand, via the carrying arm 39 and a suspension 42 and, on the other hand, via the cylinder 40 and the piston rod 41 with the side wall 24. Since the pendulum 43 extends always vertically, the position of the container 38 relative to the pendulum 43 changes. Thereby a valve 46 fixedly connected with the container 38 is displaced via the control slider 45, and the cylinder 40 is actuated with a pressure oil, depending upon the type and value of the inclination of the harvester thresher, for such a long time until the pendulum rod 44 and an axis 53 of the container extend parallel to one another. By this actuation of the cylinder 40, the angular positions of the turning levers 29 and 30 relative to the lateral wall 24 change and thereby, as mentioned above, the value of the lateral movement component of the upper sieve 14 is changed. FIG. 3 shows the position of the turning levers 29 and 30 with the extended piston rod 41, whereas FIG. 4 shows the position of the turning levers 29 and 30 with the detracted piston rod. The arrows A and B identify a plurality of possible positions between the abovementioned positions, obtained during turning movement of the upper sieve 14.

It will be understood that each of the elements described above, or two or more together, may also find a useful application in other types of constructions differing from the types described above.

While the invention has been illustrated and described as embodied in a device for uniform distribution of agricultural products, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for uniform distribution of an agricultural product on reciprocating transporting and cleaning organs of a sieve conveyor of a self-propelled harvester-thresher operating on an inclined surface, the sieve conveyor including a sieve box wherein swinging direction and thereby transporting direction of a transported product is changeable depending on a lateral inclination of the transporting and cleaning organs, the arrangement comprising a lower sieve secured to said sieve box and an upper sieve arranged in said sieve box and being swingably suspended above said lower sieve, means linked to said upper sieve to impart a movement in transporting direction to said product, and position adjusting means linked between a lateral side of said upper sieve and a wall of said harvester-thresher to change lateral position of said upper sieve relative to said sieve box in dependence upon an inclined position of the harvester thresher during threshing on an inclined surface, thus changing the direction of a movement component of the product transversely to said transporting direction.

2. An arrangement as defined in claim 1, wherein said position adjusting means includes slot-like openings formed in a side wall of said sieve box and in the wall of said harvester thresher, said slot-like openings sloping at an acute angle relative to said lower sieve, elongated holders fixed to said lateral side of the upper sieve and passing through said slot-like openings, and an operating means linked between said side wall of the harvester thresher and said holders to displace the same in said slot-like openings in response to position changes of the harvester thresher about its longitudinal axis.

* * * * *